United States Patent
Tingley

[15] 3,673,942
[45] July 4, 1972

[54] CAMERA SHUTTER

[72] Inventor: Frederick M. Tingley, Lincoln, Mass.

[73] Assignee: The United States of America as represented by the Secretary of the Air Force

[22] Filed: Oct. 20, 1969

[21] Appl. No.: 867,620

[52] U.S. Cl. ..................................................95/57
[51] Int. Cl. ...................................................G03b 9/28
[58] Field of Search ......................................95/57

[56] References Cited

UNITED STATES PATENTS

| | | | |
|---|---|---|---|
| 775,436 | 11/1904 | Wright | 95/57 |
| 934,581 | 9/1909 | Thornton | 95/57 |
| 1,075,751 | 10/1913 | Barberie | 95/57 |
| 3,006,263 | 10/1961 | Elliott | 95/57 |
| 2,541,413 | 2/1951 | Gorey | 95/57 X |
| 3,218,535 | 11/1965 | Holthaus | 310/49 R |
| 3,500,733 | 3/1970 | Kreuz | 95/57 X |

*Primary Examiner*—Samuel S. Matthews
*Assistant Examiner*—Monroe H. Hayes
*Attorney*—Harry A. Herbert, Jr. and Jacob N. Erlich

[57] ABSTRACT

A shutter for use with a conventional camera utilizing a rotary stepper servo motor as a drive means. The motor drives a first drum which in turn drives a second drum in order to advance a curtain attached thereto. This curtain has a plurality of slits therein which act as the shutter of the camera as they pass before the optical cone of the camera.

3 Claims, 4 Drawing Figures

PATENTED JUL 4 1972 3,673,942

INVENTOR.
FREDERICK M. TINGLEY
BY Harry A. Herbert Jr
Jacob N. Erlich
ATTORNEY.

CAMERA SHUTTER

BACKGROUND OF THE INVENTION

This invention relates generally to camera shutters, and, more particularly, to electrically actuated focal plane shutters for photographic cameras.

Focal plane shutters find wide usage in cameras where very high shutter speeds are employed, a prime example being aerial cameras which oftentimes are mounted in high speed, low flying jet aircraft. Generally speaking, conventional leaf-type shutters are incapable of operation at speeds in excess of 1/500 seconds, it then being necessary to resort to focal plane shutters in order to obtain the desired speeds with proper picture definition.

Focal plane shutters in common use heretofore generally employ an opaque curtain having a slit therein which scans the film to expose the latter when the curtain is advanced across the film. Limitations in this arrangement arise principally due to mechanical considerations and cost, the two factors being closely interrelated since the vibration of the curtain produced in these systems can only be remedied by increased complexity and higher tolerances of the mechanical driving components. Such vibrations produce a ripple or edging effect visible on the exposed film when the latter is enlarged for study, such as in aerial reconnaissance. Therefore, it may be appreciated that there is a definite need for improvement in this field since higher speeds are only useful in aerial reconnaissance if the enlargements of the exposed film can be read.

Almost all present cameras have spring powered shutter mechanisms which require spring rewind, manual speed adjustment and manual shutter release (limited remote release capability by means of cable controls). True remote operation of such mechanisms is complex. These mechanisms further employ mechanical cocking, release, and arresting mechanisms which are prone to high mechanical impacts which cause loss of photographic resolution.

SUMMARY OF THE INVENTION

The instant invention overcomes the problems heretofore encountered and as set forth hereinabove.

This invention provides for the replacement of the conventional spring wound shutter drive motor and mechanical motion arresting mechanism with a "servo" type electrical motor with electronic control and battery power supply. The shutter mechanism of the present invention furthermore is of adequate power and size to permit direct replacement of this mechanism in conventional cameras.

The shutter mechanism of the instant invention utilizes a "rotary stepper motor". Such a motor is a type of servo motor of relatively high torque, moderate speed, easy reversability, low inertia, and the capability of accurate self positioning in response to programmed electrical pulse excitation of its stator windings. This type of motor comprises a permanent magnet rotor and two pairs of orthogonally placed field coils.

Since the motor armature aligns itself with the appropriately polarized field coil when these are excited, the motor can be programmed for one-fourth, one-half, three-fourths, or full turn or several turns and a fraction, or even continuous synchronous rotation depending on the sequence of coil activation, and can be brought to rest at these same precisely defined rotational positions. It thus serves as a drive element, a positioner, and as a motion arresting mechanism.

In the preferred embodiment of this invention described hereinbelow, the shutter curtain is a flexible opaque film provided with multiple slits of varying widths (the longest just equal to the length of the picture area in the direction of curtain motion) to obtain various effective exposure times with a constant curtain velocity. However, it should be noted that the instant invention is also capable of incorporating therein a multi-curtained or single-slit curtain shutter. For repetitive exposures at the same exposure value, the rotary stepper motor is merely programmed to move forward, reverse, forward, etc. To obtain a "time" exposure, the largest slit is moved over the picture area, the motor is halted for the desired exposure time, and then continued in its forward motion and halted when the opaque curtain again covers the picture area. To use another exposure value, the optical path is closed (by a lens cap, reflex mirror or auxiliary curtain or capping shutter), the motor rotated in the correct direction to bring the desired slit-width aperture next into position, the optical path is freed, and the motor activated to obtain the desired exposure.

A servo type motor may also be used in conjunction with sensory elements indicating the instantaneous position of the shutter curtain. These sensors can be physical contactors, optical or magnetic sensors which couple their output signal to the motor control.

All control for the field coils of the motor is obtained from a transistorized control circuit which operates from a "clock" oscillator to provide the basic timing increments. Modern integrated circuit technology can provide these functions in exceedingly small space.

Energy for activating the motor coils is obtained by changing low voltage battery power to high voltage direct current by a DC to DC converter. The energy is stored in compact electrolytic capacitors and switched to the motor coils in proper sequence and time duration by high powered switching transistors.

It is therefore an object of this invention to provide a camera shutter mechanism which utilizes an electromagnetically controlled rotary electric motor to drive the shutter curtain directly in order to eliminate any impact mechanism and their resultant degradation.

It is a further object of this invention to provide a shutter mechanism which can be remotely controlled in both speed and release by direct electrical or wireless connections.

It is another object of this invention to provide an electrically operated shutter mechanism that can be activated in rapid sequence and can be powered by self contained batteries.

It is still a further object of this invention to provide an electrically operated shutter system which will permit the use of various focal length lenses.

It is still a further object of this invention to provide an electrically controllable shutter capable of higher effective exposure speeds.

It is still another object of this invention to provide more reliable shutter by eliminating much mechanical linkage, gearing and other mechanical components attendent to conventional focal plane curtain type shutter mechanisms.

It is still another object of this invention to provide a shutter mechanism which utilizes conventional, currently available components that lend themselves to standard mass producing manufacturing techniques.

For a better understanding of the present invention, together with other and further objects thereof, reference is made to the following description taken in connection with the accompanying drawing and its scope will be pointed out in the appended claims.

DESCRIPTION OF THE PREFERRED EMBODIMENT

Figure 1:
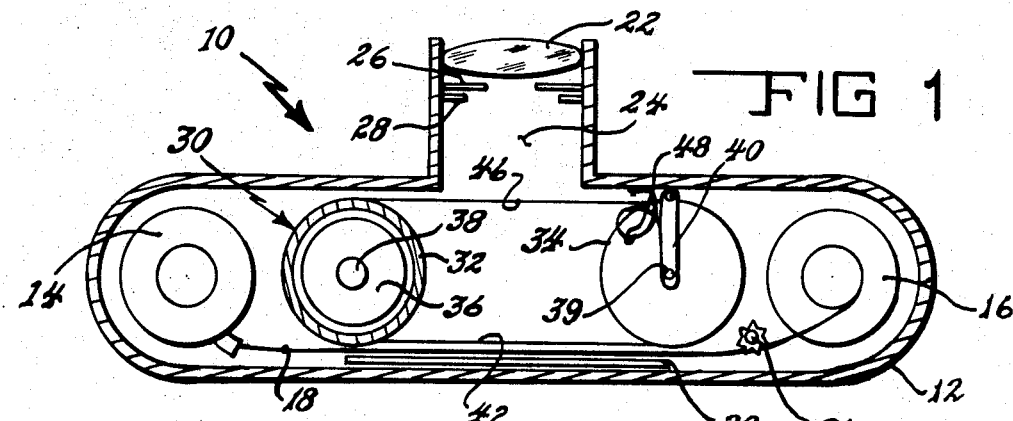
FIG. 1 is a plan view in cross section of a camera and the camera shutter of this invention.

The instant invention replaces the spring take up bobbins of a conventional camera. Referring to FIG. 1, a plan view of such a camera 10 is shown. The camera 10 has a body portion 12 which encloses a film cassette 14 and a take up reel 16. The film 18 runs in front of a pressure plate 20 and is driven by any suitable drive means such as sprocket wheel 21. A lens 22 is situated within optical cone 24 with iris 26 and auxiliary shutter 28 in back thereof for use when the multi-slit configuration of curtain is used. The camera shutter 30 making up the instant invention will be explained in detail hereinbelow and is situated within camera 10 behind the optical cone 24.

Figure 2:
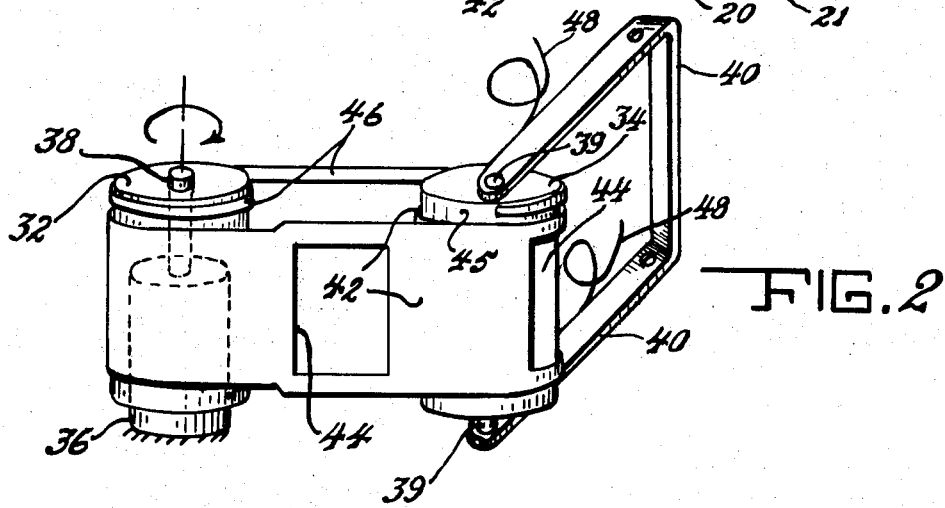
FIG. 2 is a slightly enlarged perspective view of one form of the camera shutter of this invention.

To overcome the shortcomings of spring take up bobbins heretofore in use, reference is now made to FIGS. 1 and 2 of the drawing wherein the camera shutter 30 of the instant invention is most clearly shown. A pair of drums 32 and 34, one of which is driven by a motor 36 constitute an essential part of the camera shutter 30 of this invention. The two drums 32 and 34 are identical in external dimensions having, for example, diameters of 2.54 cm and lengths of 4 cm. They are positioned on either side of the optical cone 24. With their rear tangents slightly forward of the plane of film 18 and their inside tangent clearing the optical cone 24 by a few millimeters. One of the drums 32, which shall be called the motor drum, is hollow and surrounds a motor 36 which will be described in detail hereinbelow. The drum 32 is rigidly affixed by any suitable securing means to drive shaft 38 of motor 36. The second bobbin, or idler drum 34 is rotatably mounted by bearings 39 at the top and bottom within supporting yoke 40. This yoke 40 is pivotably secured to the camera body 12 and tensioned by springs 48 urging the axis of drums 32 and 34 apart.

Referring now to FIG. 2 a curtain 42 of any suitable opaque thin material is secured by any suitable fastening means such as an epoxy resin at each end to both drums 32, 34 and is wound tightly around them and stretched between them just in front of the plane of film 18. This curtain 42 is of any suitable dimension preferably 35 mm wide and in this embodiment has a plurality of slits 44 thereon. The slits 44 are of varying widths (the longest being equal to the dimension of the picture area in the direction of curtain motion) to obtain various effective exposure times with a constant curtain velocity. The curtain 42 is wound on the bottom edge and central portion of the drums 32 and 34 leaving a small space of approximately 5 mm of drum space 45 at the top. Into this top space 45 on both drums 32 and 34 is wound a long, narrow, thin strip 46 of any suitable material such as Mylar. It is also secured by any suitable securing means to drums 32 and 34 at both ends and wound on the drums 32 and 34 like the curtain 42 but in the opposite direction. It is stretched across the inside tangent of the drums 32 and 34. Although this strip 46 is shown as being located on the top space 45 of the drums, it may be located on the bottom or on both the top and bottom.

Referring again to FIG. 2, which is representative of the back or rear tangent of the drums 32 and 34, the motor drum 32, is at the left looking from the back. When the motor 36 is operated clockwise (as indicated by the arrow in FIG. 2), it winds the curtain 42 on itself pulling the slits 44 from right to left and rotating the idler drum 34 clockwise. The curtain 42 is thus unwound from the idler drum 34 and the belt drive or narrow strip 46 is wound on the idler drum 34 and unwound from the motor drum 32. When the motor 36 is operated counterclockwise it winds the belt drive or strip 46 thus turning the idler drum 34 which in turn winds the curtain 42. In this preferred embodiment the length of the curtain 42 and drive belt 46 allows for at least five revolutions of the motor and 5 curtain slits 44 of, for example, 36, 16, 8, 4, and 2 mm.

As the curtain 42 and drive belt or strip 46 are wound on one or the other drum, the radius changes slightly generating slack in the curtain 42 which is greatest when both drums have equal turns. This slack is intolerable in obtaining sharp action between curtain slits 44 and film 18. To avoid such slack the idler drum 34 is therefore mounted by bearings 39 on yoke 40 which is spring loaded by any suitable biasing means 48.

Figure 3:
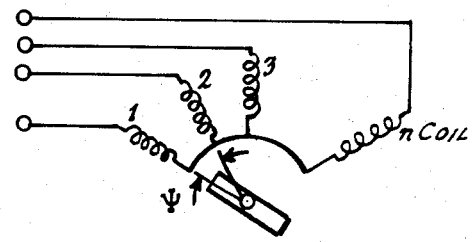
FIG. 3 shows a multi coil motor in which one end of each coil is connected to a common lead.
Figure 4:
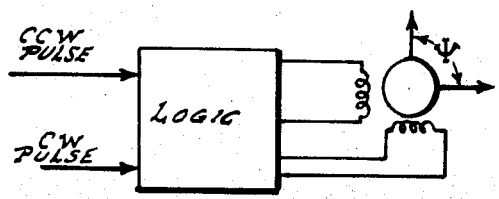
FIG. 4 is a schematic diagram of the actuation of the rotary stepper motor of this invention.

Referring now to FIGS. 2–4 of the drawing disclosure is made of another important feature of this invention, the motor 36 which is located within the hollow motor drum 32. A "rotary stepper motor" type of servo motor 36 is utilized in this embodiment because of its relatively high torque, moderate speed, easily reversibility, low inertia, and for its capability of accurate self positioning in response to programmed electrical pulse excitation of its stater windings.

The step-servo motor is a device which, when energized by DC voltages in a programmed manner, indexes in given angular increments. Its angular displacement is either clockwise or counterclockwise and is determined by the sequence in which the windings are pulsed.

There are basically two types of step-servo motors. The first works on the reaction between an electromagnetic field and a permanent magnet. This type is classified as a Permanent Magnet Step-servo (PM). The second type works on the solenoid action and is called a Variable Reluctance Step-Servo (VR). This unit works on the reaction between an electromagnetic field and soft iron rotor.

Step-Servo motors can be likened to a series of solenoid coils arranged in a circle which, when sequentially pulsed, will react with a soft iron core as in the VR motor or a permanent magnet as in the PM motor and move $\psi°$ (as shown specifically in FIG. 3).

The torque or reaction of the moving element is not a constant for each incremental motion. The torque, although not constant from point 1 to point 2 is however repeated when moving from point 2 to point 3.

The stepping angle "$\psi$" is determined by design but can not be greater than $2\pi/3$ and still have directional characteristics and uniform motion. It is possible, size allowing, to make the steps any value $2\pi/n$ where $n \geq 3$.

Switching from one winding to another in a sequential manner 1, 2, 3, ... n, 1, 2, ... results in a non-linear motion of $2\pi/n$ radians per switch. The shaft will rotate at an average speed in accordance with the following equation:

$$N_{av} = \frac{60(PPS)}{n}$$

$PPS$ = Pulses/sec.
$n$ = Phases
$N_{av}$ = Speed in r.p.m.

The average speed will be in synchronism with the rate of pulsing. The resultant angular motion will be x radians/switch. This is a conversion from digital data to analog position. This exact relationship between pulses and angular motion is the most important characteristic of Step-Servo Motors.

High speed switching by means of solid state devices has accelerated the growth of Step-Servo Motors. D. C. power can now be converted directly into precise rotational motion in synchronism with input intelligence. This is schematically represented in FIG. 4. Each pulse results in the output shaft moving $\psi°$ either clockwise or counterclockwise.

The type of motor 36 of this invention utilizes a permanent magnet rotor and two pairs of orthogonally placed field coils (which may have two or four pairs of leads brought out for electrical connection). Since the motor armature aligns itself with the appropriately polarized field coil when these are excited the motor 36 can be programmed for one-fourth, one-half, three-fourths, or full turn or several turns and a fraction, or even continuous synchronous rotation depending on the sequence of coil activation, and can be brought to rest at the same precisely defined rotational positions. It thus serves as a drive element, a positioner, and as a motion arresting mechanism.

All control for the field coils of the motor 36 is obtained from a control circuit (not shown) which operates from a "clock" oscillator to provide the basic timing increments. Energy for activating these motor coils is obtained by changing low voltage battery power to high voltage direct current by a DC to DC converter. The energy is stored in compact electrolytic capacitors and switched to the motor coils in proper sequence and time duration by high powered switching transistors (not forming part of the instant invention).

MODE OF OPERATION

In use, the camera shutter 30 of this invention may be mounted within any conventional camera 10 as shown most clearly in FIG. 1. One of the essential elements of the camera shutter 30 of this invention is the curtain 42 which is a thin flexible, opaque material which in this embodiment is provided with multiple slits 44 of varying widths to obtain various effective exposure time with a constant curtain velocity.

As shown most clearly in FIG. 2, the rotary stepper motor 36 can be actuated to operate in either the clockwise or counterclockwise direction. In the clockwise direction the curtain 42 winds itself upon motor drum 32 and pulls the slits 44 in front of optical cone 24 from right to left. As the curtain 42 is unwound from the idler drum 34 and wound upon the motor drum 32 the drive belt of narrow strip 46 is wound upon the idler drum 34. When the motor 36 is operated in the counterclockwise direction it winds the strip 46, thus turning the idler drum 34 which in turn winds the curtain 42.

Therefore, when it becomes desirable for repetitive exposures at the same exposure value, the rotary stepper motor 36 is merely programmed to move forward, reverse, forward, etc.

To obtain "time" exposure (where time exposure is defined as an exposure longer in time than that provided by the longest curtain slit 44 traveling past the picture focal plane in the normal curtain velocity), the largest slit 44 is moved over the picture area, the motor 36 halted for the desired exposure time, and then continued in its forward (or reverse) motion and halted with the opaque curtain 42 again covers the picture area.

To use another exposure value, the optical path is closed (by a lens cap, reflex mirror or auxiliary curtain or capping shutter 28), the motor 36 is rotated in the correct direction to bring the desired slit 44 into position, the optical path freed, and the motor activated to obtain the desired exposure. By the addition of a photosensor connected to the motor control circuitry, automatic exposure control can be achieved.

Although the invention has been described with reference to a particular embodiment, it will be understood to those skilled in the art that the invention is capable of a variety of alternative embodiments within the spirit and scope of the appended claims.

I claim:

1. In a camera having a body portion, a film, and an optical cone the improvement therein comprising a camera shutter having a first drum located one one side of said optical cone and a second drum located on the other side of said optical cone, a rotary stepper servo motor having a drive shaft, said motor being secured to said body portion, said first drum being operatively connected to said drive shaft, said second drum being rotatably mounted on a pair of bearings, each of said bearings being mounted on a spring biased yoke, and said yoke being pivotably secured to said body portion, a spring operably connected between said yoke and said body portion and a curtain having at least one slit therein secured at one end to said first drum and wound there around and secured at the other end to said second drum and wound therearound, said spring biasing said second drum away from said first drum thereby eliminating any slack in said curtain whereby operation of said motor winds said curtain upon one of said drums and thereby said slit moves across the front of said optical cone.

2. In a camera as defined in claim 1 wherein a thin narrow strip is secured to one end of said first drum and wound therearound and secured at the other end to said second drum, said curtain being stretched across one tangent between said pair of drums while said strip is stretched across the opposite tangent between said pair of drums whereby when said motor is operated in one direction said curtain winds itself on one of said drums while said strip winds itself on said other drum, and when said motor is operated in the opposite direction said strip winds itself on said one drum while said curtain winds itself on said other drum.

3. In a camera as defined in claim 2 wherein said first drum is hollow and said motor is located within said hollow drum.

* * * * *